(12) United States Patent  (10) Patent No.: US 6,225,575 B1
Hoyland  (45) Date of Patent: May 1, 2001

(54) MOBILE WEIGHING APPARATUS

(76) Inventor: Jefford C. Hoyland, 1643 31st Ave., Greeley, CO (US) 80631

( * ) Notice: Subject to any disclaimer, the term of this patent is extended or adjusted under 35 U.S.C. 154(b) by 0 days.

(21) Appl. No.: 09/412,019

(22) Filed: Oct. 4, 1999

(51) Int. Cl.[7] ................................................. G01G 19/52
(52) U.S. Cl. ................................ 177/144; 177/245
(58) Field of Search .......................... 177/144, 126, 177/245

(56) References Cited

U.S. PATENT DOCUMENTS

| | | | |
|---|---|---|---|
| 3,338,323 | * 8/1967 | Swersey | 177/144 |
| 3,630,299 | * 12/1971 | Albagli | 177/145 |
| 3,722,611 | * 3/1973 | Trikkonen | 177/245 |
| 3,732,938 | * 5/1973 | Nelson | 177/161 |
| 3,998,284 | * 12/1976 | James | 177/139 |
| 4,013,135 | * 3/1977 | Kechely | 177/144 |
| 4,126,197 | * 11/1978 | Kechely | 177/145 |
| 4,482,783 | * 11/1984 | Laimins | 177/147 |
| 4,799,562 | * 1/1989 | Burrows et al. | 177/144 |
| 5,380,269 | * 1/1995 | Urso | 177/144 |
| 5,414,225 | * 5/1995 | Garfinkle | 177/199 |
| 5,448,022 | * 9/1995 | Rishel | 177/126 |
| 5,511,571 | * 4/1996 | Adrezin et al. | 177/245 |
| 5,831,221 | * 11/1998 | Geringer et al. | 177/144 |
| 5,861,582 | * 1/1999 | Flanagan et al. | 177/144 |
| 5,994,649 | * 11/1999 | Garfinkle et al. | 177/126 |
| 6,069,325 | * 5/2000 | Aoki | 177/136 |

* cited by examiner

*Primary Examiner*—Randy W. Gibson
(74) *Attorney, Agent, or Firm*—Dorr, Carson, Sloan & Birney, P.C.

(57) ABSTRACT

A mobile weighing apparatus in the form of a wheeled support structure (e.g., a wheelchair, wheeled bed, gurney, cart, motorized truck, etc.) that is especially adapted to weighing a human being supported by said apparatus. The apparatus employs a plurality of load cells that are respectively attached to a plurality of vertical support elements of said apparatus. Signals from each load cell are routed to a microprocessor which processes the signals and displays the weight carried on the apparatus.

4 Claims, 9 Drawing Sheets

MOBILE WEIGHING APPARATUS

FIELD OF THE INVENTION

This invention generally relates to weighing apparatus. More particularly, it relates to mobile weighing apparatus that are especially well suited for weighing incapacitated human beings.

BACKGROUND OF THE INVENTION

Although scales are commonly available for weighing human beings who are ambulatory, it is sometimes difficult and/or cumbersome to weigh humans who are not ambulatory or who are otherwise incapacitated. For example, an incapacitated person in a wheelchair must be wheeled to a scale of the type commonly used to weigh people who can readily step up on such a scale. Then the incapacitated person must be moved to an unsupported standing position on the scale in order to get a reasonably accurate weight measurement. The incapacitated person then must be safely returned to the wheelchair. If the person cannot stand, this weighing procedure is not feasible.

Weighing a severely incapacitated person who is generally confined to a bed, gurney, etc. is an even more difficult task because it generally requires that the incapacitated person be greatly assisted in getting out of, and back into, the bed, gurney, etc. Indeed, in some cases, a sling may be needed to lift a severely incapacitated person out of a bed or gurney for such a weighing. Such a person then may need to be vertically supported in a standing position on a scale. To the extent that vertical support is rendered to that severely incapacitated person, the weight reading is "falsified".

It also is possible to weigh a person who is confined to a wheeled apparatus such as a wheelchair, wheeled bed, gurney, cart and the like by rolling the wheeled apparatus, and the person on it, upon a scale adapted for receiving such a wheeled apparatus. The total combined weight of the person and the wheeled apparatus is thus obtained. At some point in time, it also is necessary to weigh the wheeled apparatus (e.g., a wheelchair) alone in order to subtract the weight of that apparatus from the combined weight of the person (and his or her clothing, bedding, etc.) and the wheeled apparatus. This weighing procedure does not greatly disturb the incapacitated person, but it does require a special type of scale that is not commonly available—and rather expensive.

In short, all of these procedures for weighing incapacitated people are difficult, not well suited to giving accurate weight readings and/or require specialized, expensive, scales. Use of some of these weighing procedures also involves risk of injury to the incapacitated person and/or those attending such a person whenever the incapacitated person is removed from, and returned to, a wheelchair, wheeled bed, gurney, etc.

SUMMARY OF THE INVENTION

The present invention provides mobile weighing apparatus that enable a wheeled support structure such as a wheelchair, wheeled bed, gurney, cart, etc. to also serve as a scale for weighing an object carried by that wheeled structure. The object weighed by applicant's apparatus may be inanimate or animate in nature. For example, the mobile weighing apparatus of this invention might be a cart upon which commercial goods of virtually any kind may be weighed and transported. The mobile weighing apparatus of this invention are however especially useful in medical care situations because the weight of an incapacitated person in a wheelchair, wheeled bed, gurney, cart and the like can be easily determined without requiring the incapacitated person to get out of the mobile weighing device, step up on a scale and come to an unsupported, standing position.

This invention achieves these weighing objectives by connecting a load cell to each of a plurality of load-bearing, substantially vertical, support elements of a mobile weighing apparatus. A plurality of load cell-generated electrical signals are routed to, and processed by, a microprocessor which, after making appropriate computations, displays the weight of an object on the mobile weighing device. To this end, the mobile weighing apparatus of this patent disclosure will generally comprise: (1) a frame that includes a plurality of load-bearing, substantially vertical, support elements; (2) a plurality of wheels carried on axles attached to the frame; (3) a plurality of load cells that are respectively connected to each of a certain number of the plurality of load-bearing, substantially vertical, support elements (e.g., connection of each respective load cells to at least two, preferably three, and most preferably four, load-bearing, substantially vertical, support elements of the frame is highly preferred); and (4) a microprocessor that is electrically connected to each load cell in the plurality of load cells and which is capable of processing electrical signals from each load cell in a manner such that it determines the weight of an object (and especially a human being) carried by the mobile weighing apparatus and then displays that weight. Again, the frame of applicant's mobile weighing apparatus may define any number of vehicle types e.g., a wheelchair, a wheeled bed, a gurney, a cart, etc. Indeed, the mobile weighing apparatus of this patent disclosure may even be a motorized vehicle such as an electrically powered wheelchair.

In one preferred embodiment of this invention, the mobile weighing apparatus will constitute a wheelchair comprising: (1) a frame having (i) at least two, opposing, right front, load-bearing, substantially vertical, support elements, (ii) at least two, opposing, left front, load-bearing, substantially vertical, support elements, (iii) at least two, opposing, right rear, load-bearing, substantially vertical, support elements and (iv) at least two, opposing, left rear, load-bearing, substantially vertical, support elements, (2) a right front wheel that is rotatably mounted on the frame; (3) a left front wheel that is rotatably mounted on the frame; (4) a right rear wheel that is rotatably mounted on the frame; (5) a left rear wheel that is rotatably mounted on the frame; (6) a load cell connected to the at least two, opposing, right front, load-bearing, substantially vertical, support elements; (7) a load cell connected to the at least two, opposing, left front, load-bearing, substantially vertical, support elements; (8) a load cell connected to the at least two, opposing, right rear, load-bearing, substantially vertical, support elements; (9) a load cell connected to the at least two, opposing, left rear, load-bearing, substantially vertical, support elements, and (10) a microprocessor that is electrically connected to each load cell and which is capable of processing electrical signals from each load cell in a manner such that it determines the weight of a person in the wheelchair and then displays that weight.

In another, particularly preferred, embodiment of this invention, the mobile weighing apparatus will constitute a wheelchair comprising: (1) a frame having (i) two, upper, right front, load-bearing, substantially vertical, support elements and two, opposing, lower, right front, load-bearing, substantially vertical, support elements, (ii) two, upper, left front, load-bearing, substantially vertical, support elements and two, opposing, lower, left front, load-bearing, substantially vertical support elements, (iii) an upper, right rear, loadbearing, substantially vertical, support element, an opposing, lower, right rear, load-bearing, substantially vertical, support element, (iv) an upper, left rear, load-bearing, substantially vertical, support element and (v) an opposing, lower, left rear, load-bearing, substantially vertical, support element; (2) a right front wheel that is rotatably mounted to the frame; (3) a left front wheel that is rotatably mounted to the frame; (4) a right rear wheel rotatably mounted to the frame; (5) a left rear wheel rotatably mounted to the frame; (6) a load cell connected to each of the two, upper, right front, load-bearing, substantially vertical, support elements and to each of the two, opposing, lower, right front, substantially vertical support elements; (7) a load cell connected to each of the two, upper, left front, load-bearing, substantially vertical, support elements and to each of the two, opposing, lower, left front, substantially vertical, support elements; (8) a load cell connected to the upper, right rear, load-bearing, substantially vertical, support element and to the opposing, lower, right rear, load-bearing, substantially vertical, support element; (9) a load cell connected to the upper, left rear, load-bearing, substantially vertical, support element and to the opposing, lower, left rear, load-bearing, substantially vertical, support element; and (10) a microprocessor that is electrically connected to each load cell and which is capable of processing electrical signals from each load cell in a manner such that it determines the weight of a person in the wheelchair and then displays that weight.

Other advantages and features of the mobile weighing apparatus of this invention will become more apparent from the following drawings and more detailed descriptions. Once again, a wheelchair will be used to further illustrate the mobile weighing apparatus of this patent disclosure, but it warrants repeating that the principles taught herein can be applied to other kinds of mobile weighing apparatus as well.

DETAILED DESCRIPTION OF THE INVENTION

Figure 1:
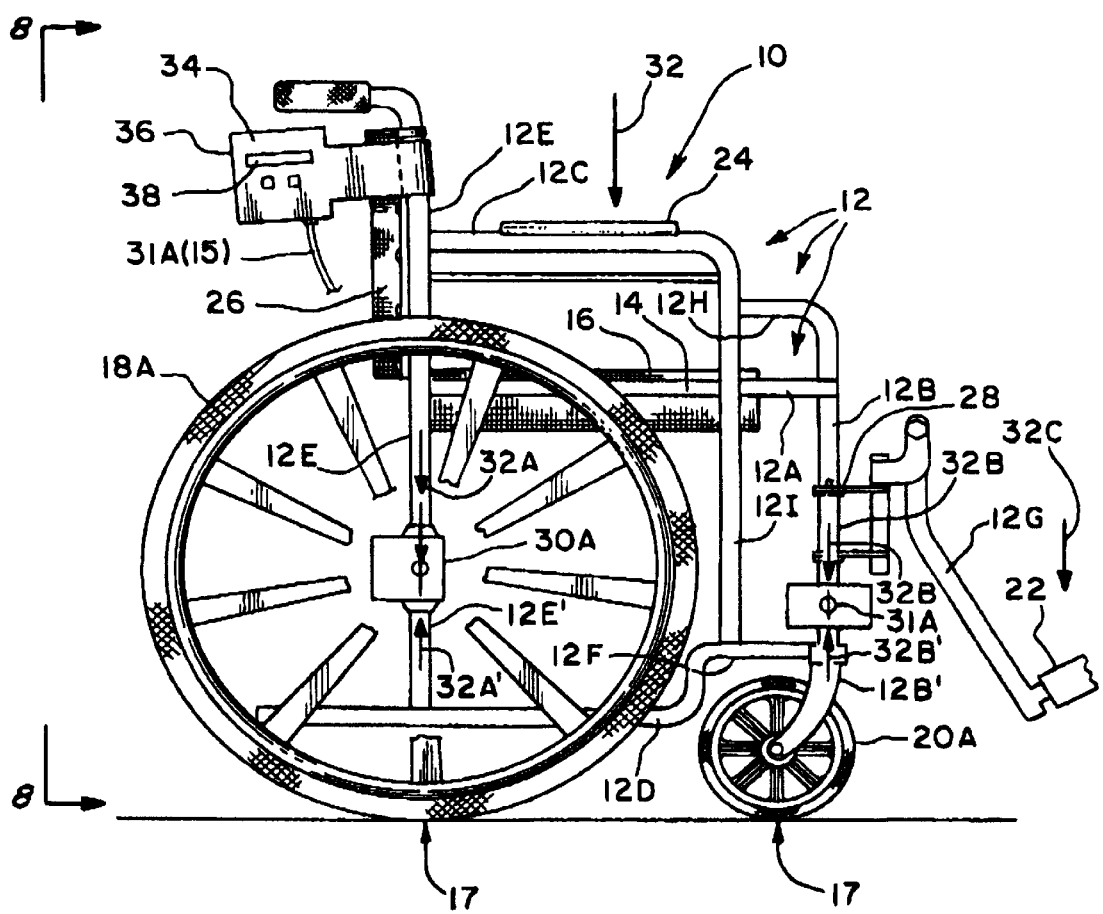
FIG. 1 is a side elevational view of a wheelchair made according to the teachings of this patent disclosure wherein said wheelchair includes a front load cell that is attached to two, opposing, load-bearing, substantially vertical, support elements.

FIG. 1 shows a partially exploded, side elevational view of a wheelchair 10 generally constructed according to the teachings of this patent disclosure. The wheelchair 10 has an overall frame 12 comprised of various tubular elements 12A, 12B, 12C, 12D, 12E, 12F, 12G, 12H, 12I, etc. This overall frame 12 includes a plurality of load-bearing, substantially vertical, support elements such as 12B, 12B', 12I, 12E, 12E', etc. The frame 12 also includes certain substantially horizontal members, e.g., horizontal member 14A, that serves to help support a seat 16 upon which a load such as a portion of the weight of an incapacitated human being (not shown) is placed. Ultimately, the overall frame 12 is supported by its load-bearing wheels' contact with a ground or floor surface 17.

FIG. 1 shows the wheelchair 10 provided with a relatively large, rear wheel 18A and a relatively small, front wheel 20A. As can be better seen in FIG. 8, a corresponding rear wheel 18B and a corresponding front wheel 20B are mounted on the opposite side of the wheelchair 12 depicted in FIG. 1. Thus, observing this mobile weighing apparatus 10 from the rear (e.g., in the manner shown in FIG. 8), rear wheels 18A and 18B might be termed, respectively, the right rear wheel and the left rear wheel. This same "right/left" terminology can be applied to the front wheels 20A (right) and 20B (left) as well. A "left" horizontal member 14B for supporting seat 16 also can be seen in FIG. 8.

Figure 2:
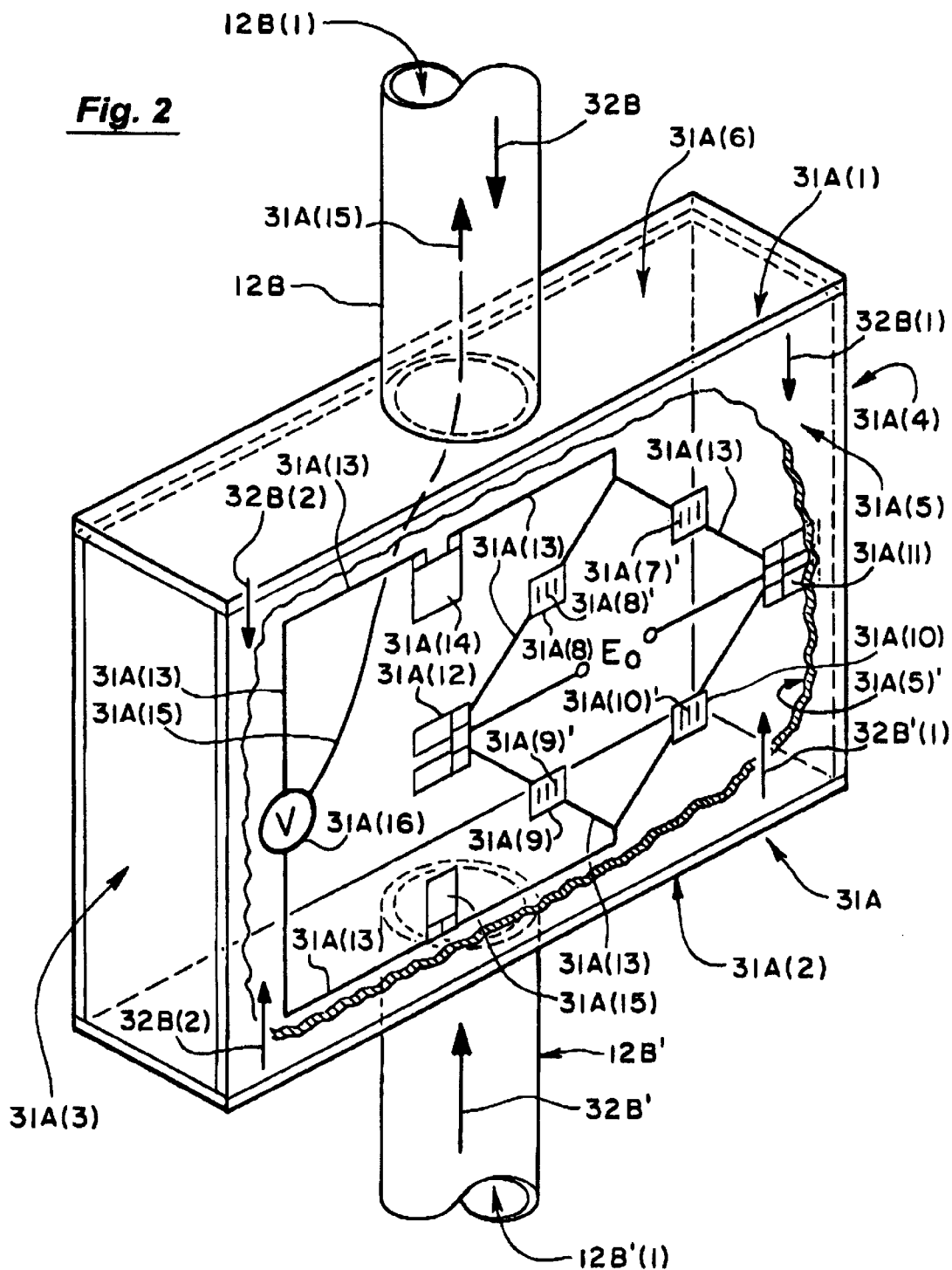
FIG. 2 is an enlarged, cut-away, view of a load cell connected to two, opposing, load-bearing, substantially vertical, support elements in the manner generally shown in FIG. 1.

The wheelchair 10 shown in FIG. 1 is shown provided with a footrest 22, an elbow rest 24 and a back rest 26. The footrest 22 is shown mounted on a rotatable collar 28 that is mounted on front vertical support element 12B in ways known to those skilled in the wheelchair manufacturing arts. So mounted, the footrest 22 constitutes another element of the overall frame 12. FIG. 1 also generally indicates that the wheelchair 10 is provided with a microprocessor 34 that resides in a housing 36 having a weight display 38. A representative wire 31A(15) leading from a load cell (e.g., leading from load cell 31A as shown in FIG. 2) is depicted leading to the microprocessor 34 shown in FIG. 1.

Load-bearing, substantially vertical, support elements 12E, 12E', 12B and 12B' of frame 12 are each shown mechanically connected to a respective load cell. For example, the top surface of load cell 30A is shown mechanically connected to an upper, right rear, load-bearing, substantially vertical, support element 12E. An opposing, lower, right rear, substantially vertical, support element 12E' is shown connected to the bottom surface of load cell 30A. Via the structure of the overall frame 12, support element 12E' is ultimately supported by wheel contact with the floor surface 17. Thus, regardless of the magnitude of a downward force 32A placed upon it, the lower, right rear, substantially vertical, support element 12E' will provide an, opposing, upward, force 32A to any downward force 32A' placed on the load cell 30A by the upper support element 12E. Consequently, load cell 30A will be compressed between downward force 32A and upward force 32A'. The resulting mechanical compression placed on the load cell 30A by opposing forces 32A and 32A' is detected and transduced by the load cell 30A, in ways hereinafter more fully described, into an electrical signal (e.g., a voltage signal) that is sent to microprocessor unit 34.

Similarly, a downward force placed on load cell 31A by certain components of the weight of the wheelchair—and a person in it—is generally depicted by downward force direction arrow 32B on the upper, right front vertical support element 12B. In the general manner just discussed with respect to the downward force 32A on load cell 30A, the downward force 32B on lead cell 31A may be thought of as being opposed by an opposing or upward force 32B' placed on the bottom of load cell 31A by a lower, right front, load-bearing, substantially vertical support element 12B' (here again, this upward force 32B' is ultimately provided by wheel contact with the ground 17). Thus, load cell 31A likewise experiences a compression action when it is pressured between opposing forces 32B and 32B'. A strain on load cell 31A resulting from these opposing compressive forces is likewise detected and transduced into an electrical signal which is sent to the microprocessor 34. It also should be noted that the downward force 32B placed on load cell 31A need not necessarily be of the same magnitude as the downward force 32A placed on load cell 30A. Such differences are taken into account by a computer program that constitutes a part of the microprocessor 34.

It might also be noted here that those forces placed on the overall frame 12 by various cantilevered force components, (e.g., for example, the cantilevered force component depicted by downward direction arrow 32C (e.g., such as those resulting from the cantilevered weight of the wheelchair occupant's legs and feet) will, to some degree, become a component of the loads placed on the load cells of this mobile weighing apparatus 10. This is especially true of those load cells, e.g., load cell 31A, that are connected to a vertical support, e.g., vertical element 12B, to which a cantilevered load such as that depicted by direction arrow 32C is transferred. Be these cantilevered forces as they may, the microprocessor unit 34 can be programmed in ways known to those skilled in this art to deal with cantilevered force components, such as the one generally depicted in FIG. 1 by force direction arrow 32C.

Methods of connecting load cells with load bearing, vertical support elements such as members 12B and 12B' of applicant's overall frame 12 are well known to those skilled in making, mounting and using such load cells. However, for purposes of illustration, a variety of detailed representative vertical support element/load cell connections are given in FIGS. 2, 3, 5 and 6. For example, FIG. 2 depicts, in exploded, cut-away detail, the load cell 31A shown in FIG. 1. This load cell 31A has a top surface 31A(1), a bottom surface 31A(2), a left side surface 31A(3), a right side surface 31A(4), an outside face piece 31A(5) and an inside face piece 31A(6). The upper, load-bearing, vertical support element 12B is shown in abutting mechanical connection with the top surface 31A(1) of load cell 31A. For example the vertical support element 12B can be welded, screwed or glued to the top surface 31A(1) of the load cell 31A. A downward force or load placed on vertical support element 12B is again depicted by downward force direction arrow 32B. This downward force 32B also is depicted as being transmitted as a continuum of downward vertical force components 32B(1), 32B(2), etc. over the outside face piece 31A(5) of the load cell 31A. Such forces create a strain in the load cell which are detected and transduced into electrical signals. FIG. 2 also illustrates that vertical support element 12B is preferably tubular in nature. Hence, it is shown provided with a hollow core region 12B(1) through which electrical connection wires, such as wire 31A(15), may be conveniently passed in order to electrically connect the load cell 31A with the microprocessor 34 in the manner generally suggested in FIG. 1.

Similarly, FIG. 2 depicts a lower, opposing, vertical support element 12B' in abutting contact with the bottom surface 31A(2) of load cell 31A. Vertical support element 12B' is also shown provided with a hollow center region 12B' (1). The upward force carried by lower vertical support element 12B' is depicted by upward force direction arrow 32B'. This force 32B' also is, in turn, depicted as being transmitted as a continuum of upward vertical force components 32B' (1), 32B' (2), etc. over the outside face piece 31A(5) of the load cell 31A. Thus, the right face piece 31A(5) is subjected to a compression force between these downward forces and upward forces.

FIG. 2 also shows various strain gauge element attached (typically by gluing a flat face side of the strain gauge to a rear side 31A(5)' of the outside face piece 31A(5), of the load cell 31A). A strain placed on the load cell—and particularly on its right rear side 31A(5)—is detected by such strain gauge elements which, under compression, undergo strain and an accompanying change in the electrical resistivity of their strain gauge element(s). Again, it is this change in electrical resistivity that is detected and transduced into an electrical signal that is sent to the microprocessor 34.

Those skilled in the arts of making and using load cells will appreciate that such load cells are generally comprised of an array of strain gauge elements, resistor elements and voltage detection elements. These elements are usually electrically connected in a Wheatstone bridge type circuit such as the one depicted in FIG. 7. The representative circuit described in FIG. 7 also is shown, by way of example, as part of the load cell 31A detailed in FIG. 2. This representative circuit includes a series of strain gauges 31A(7), 31A(8), 31A(9) and 31A(10). Each of these strain gauges respectively has at least one strain detector element, e.g., 31A(7)', 31A(8)', 31A(9)' and 31A(10)' whose function is to transduce the mechanical strain that it experiences into electrical signals. Preferably, all of these strain gauge elements are attached to the same vertical surface. For example, FIG. 2 depicts all of these strain gauge elements attached to the rear surface 31A(5)' of outside face piece 31A(5). In any case, these electrical signals are then further processed through use of resistor pattern elements such as those indicated by item numbers 31A(11) and 31A(12) in FIG. 2. Such load cell circuits also typically include compensation resistor elements such as those depicted by item numbers 31(a)14 and 31A(17). The electromotive force $E_o$ produced by such a load cell circuit is also generally depicted by a voltage detection device 31A(16). The connector wires needed to create this load cell circuit are generally indicated by item number 31A(13) throughout the load cell circuit indicated in FIG. 2. Once created and detected by such a load cell circuit, a resulting voltage can be transmitted, e.g., via line 31A(15), to the microprocessor 34.

Figure 3:
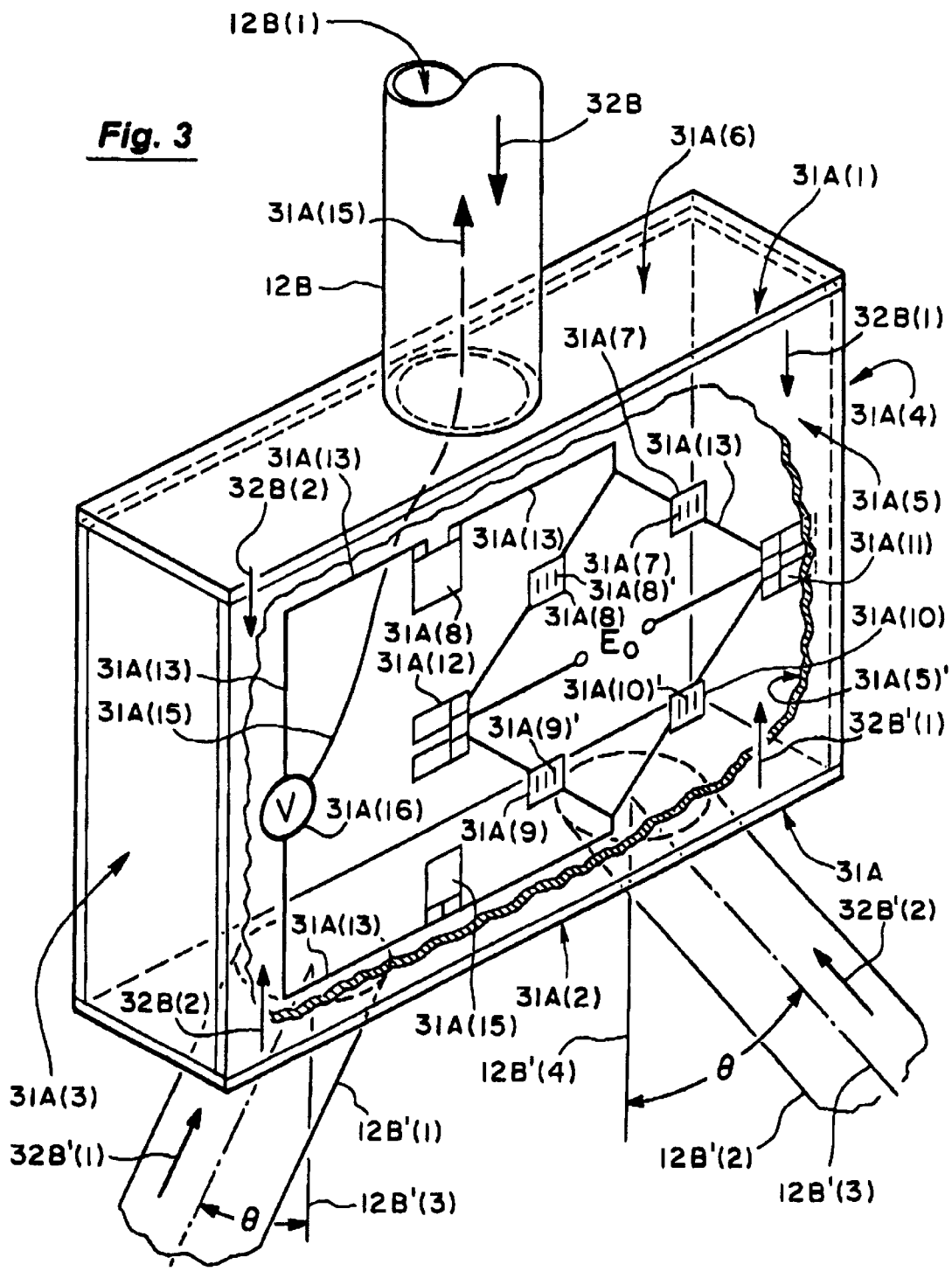
FIG. 3 is an enlarged, cut-away, view of a load cell connected to three, load-bearing, elements, two of which are not truly vertical, but which still fall under applicant's hereinafter given definition of the term "substantially vertical".

FIG. 3 depicts, in exploded, cut-away detail, a load cell 31A that is very similar to the load cell 31A shown in FIG. 2. The only difference is the fact that the load cell 31A shown in FIG. 3 is shown being supported by two support elements 12B' (1) and 12B' (2) rather than the single, lower, vertical support element 12B' shown in FIG. 2. Thus, a vertical component 32B' (1) of the force carried by support element 12' (1) and a vertical component 32B' (2) of the force carried by support element 12B' (2) each serve to support the load cell 31A against any downward force (e.g., downward force 32B) placed on the load cell via upper vertical support element 12B.

FIG. 3 also shows that vertical support elements 12B' (1) and 12B' (2) each contact the bottom surface 31A(2) of the load cell 31A at an angle θ, i.e., an angle θ relative to vertical line 12B' (3) or relative to vertical support line 12B' (4). Thus, support elements 12B' (1) and 12B' (2) are not truly "vertical". Nonetheless, such elements can be used to mechanically support the load cells (e.g., load cell 31A) of this invention and thereby create strain forces upon a load cell's strain gauge elements. Hence, for the purposes of this patent disclosure, the term "vertical" (e.g., as in the terms "vertical support element", "substantially vertical support elements", etc.) can be taken to mean a support element that is connected to a load cell at an angle from the vertical of 45° or less. In this regard, applicant also would note that use of truly vertical support elements (e.g., those whose angle θ of element connection to the load cell from a true vertical line such as vertical lines 12B' (3) and 12B' (4) in FIG. 3 is substantially zero degrees) are preferred; but that support elements (e.g., 12B' (1) and 12B' (2) that address a bottom or top surface of the load cell at an angle of 45° or less can also be employed.

Figure 4:
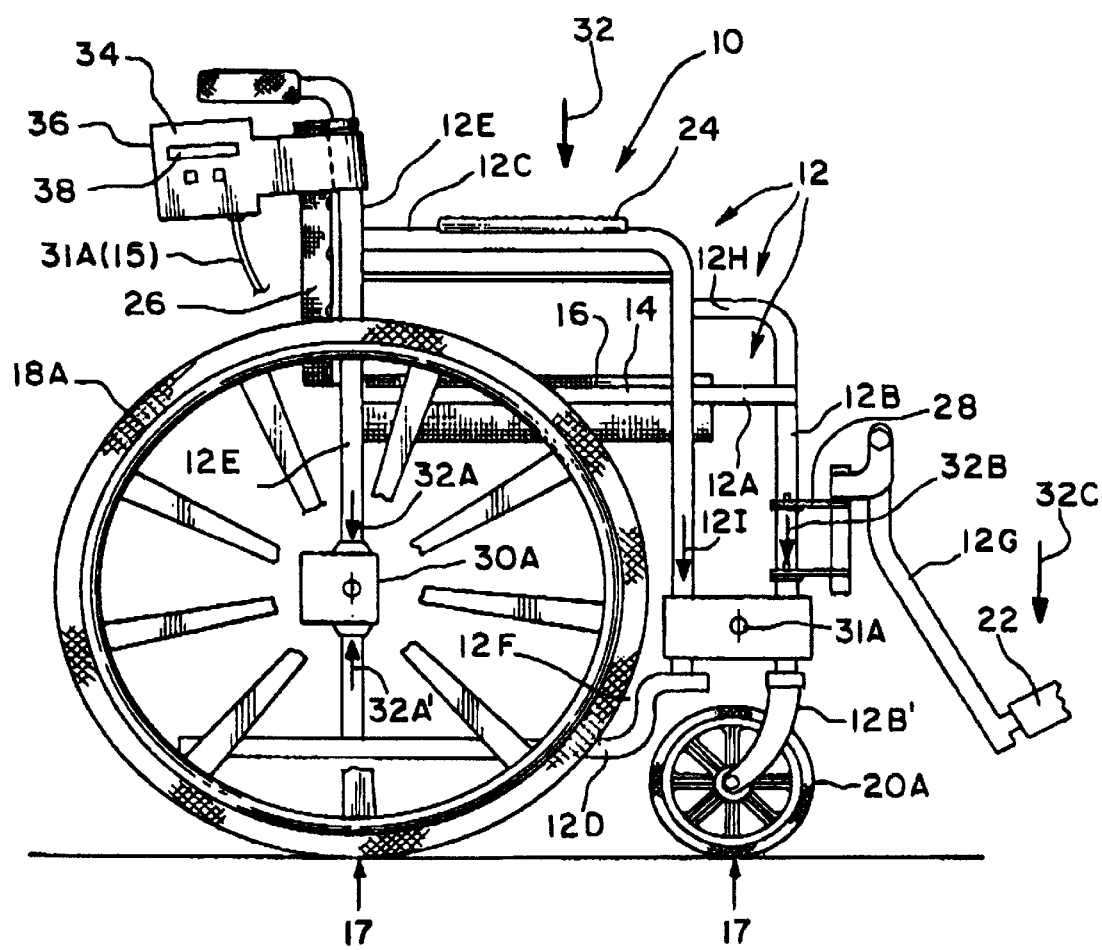
FIG. 4 is a side elevational view of a wheelchair made according to another embodiment of this patent disclosure wherein said wheelchair includes a front load cell that is connected to each of two upper, load-bearing, substantially vertical, support elements and likewise connected to each of two, opposing, lower, substantially vertical, support elements.

FIG. 4 is a side elevational view of a wheelchair made according to another teaching of this patent disclosure wherein said wheelchair includes a front load cell that is attached to each two, upper load-bearing, substantially vertical, support elements and two, opposing, lower, vertical support elements.

Figure 5:
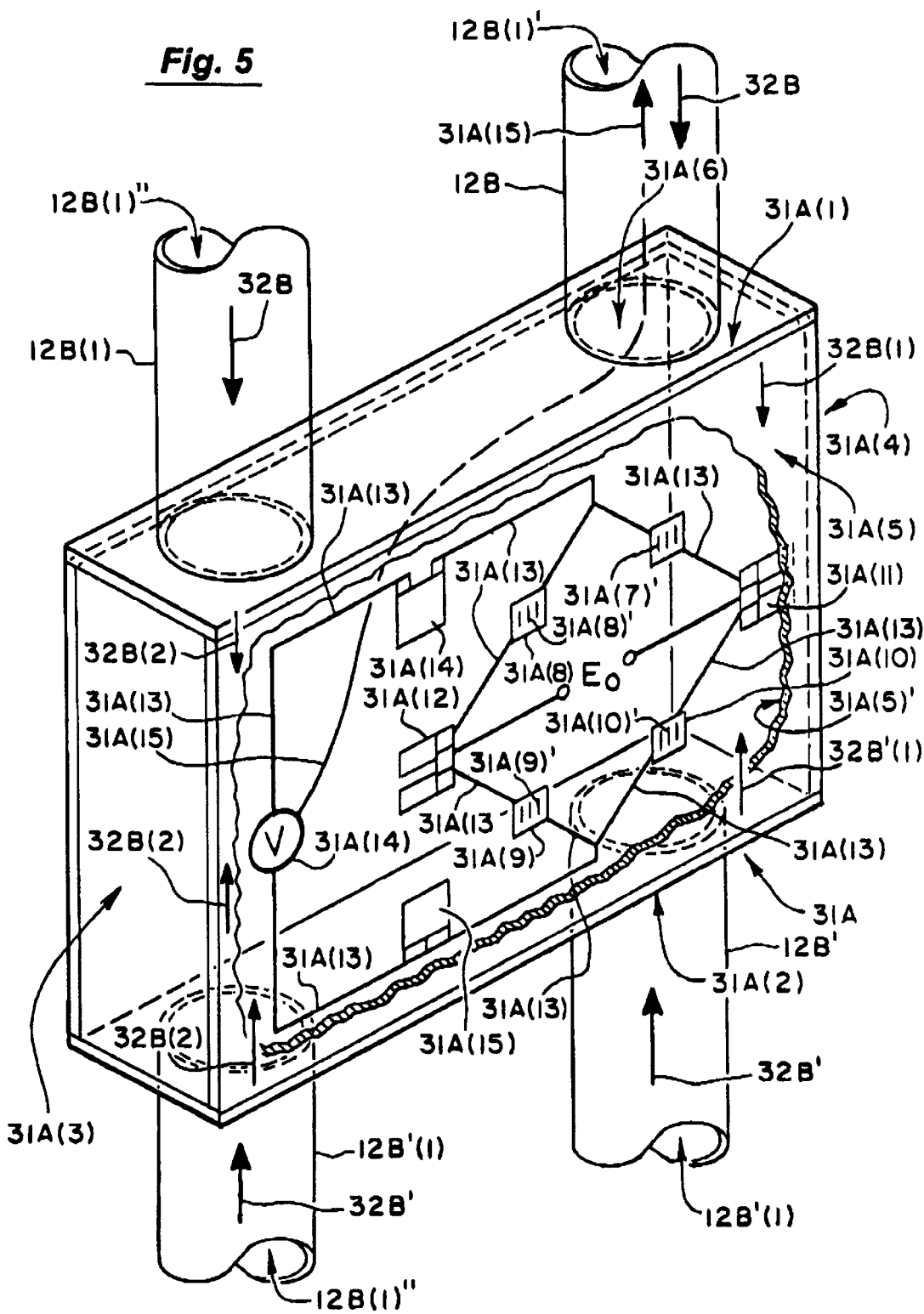
FIG. 5 is an enlarged, cut-away view of a load cell connected to two, upper, load-bearing, substantially vertical, support elements and two, opposing, lower, substantially vertical, support elements in the manner generally shown in FIG. 4.

FIG. 5 is an enlarged, cut-away view of a load cell connected to two, upper, load-bearing, substantially vertical, support elements and to two, opposing, lower, vertical support elements in the manner shown in FIG. 4. In FIG. 5, the load cell 31A is shown compressed from above by two, upper, load-bearing, substantially vertical support elements 12B and 12B(1). The load carried by vertical support element 12B is depicted by force direction arrow 32B. Vertical support element 12B is shown provided with a core 12B(1)' through which a wire 31A(15) passes. The other, upper, vertical support element 12B(l) carries a downward force 32B and also is tubular in nature as indicated by its core 12B(1)". The lower, vertical support element that generally opposes the upper support element 12B is designated 12B'. It carries an opposing, upward, vertical force 32B' and is depicted with a core 12B' (1)'. Similarly, lower, vertical support element 12B' (1) carries an upward force 32B' and has a core 12B' (1)".

Figure 6:
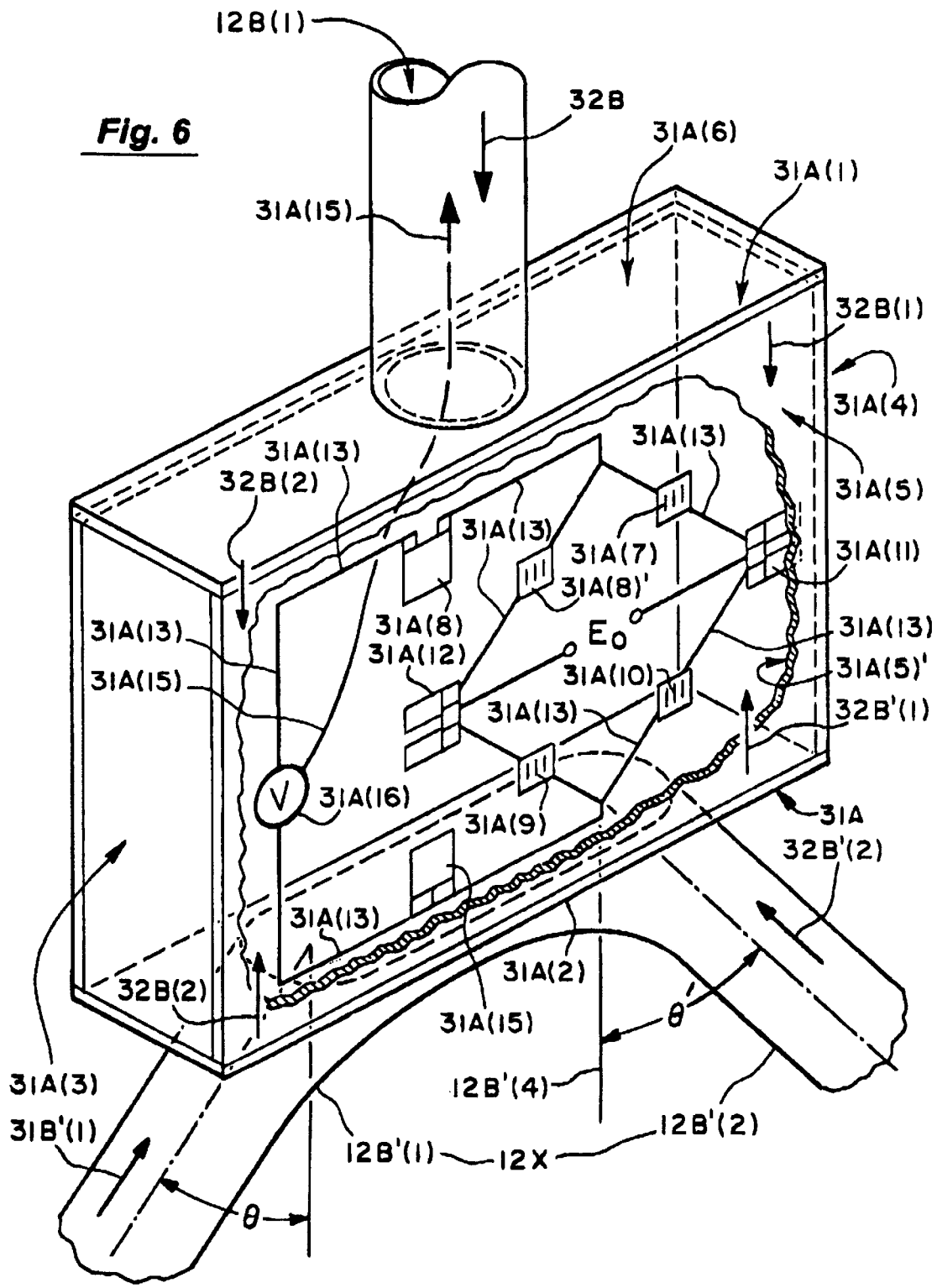
FIG. 6 is an enlarged, cut-away, view of a load cell connected to an upper, load-bearing, substantially vertical support element and a lower support element comprised of a tubular element bent in such a manner that it does not address the load cell at a truly vertical angle and which has extended level portion that supports the underside of a load cell.

FIG. 6 is an enlarged, cut-away view of a load cell whose underside is supported by a load-bearing, substantially vertical support element that is bent in a manner such that an extended portion of the tubular element abuts against, and hence supports, the bottom 31A(2) of load cell 31A. In other words the lower support element 12X is a bent tubular element having a left end 12B' (1) that approaches the bottom 31A(2) of the load cell 31A at an angle θ and a right end 12B' (2) that approaches the bottom of the load cell at an angle θ'.

Figure 7:
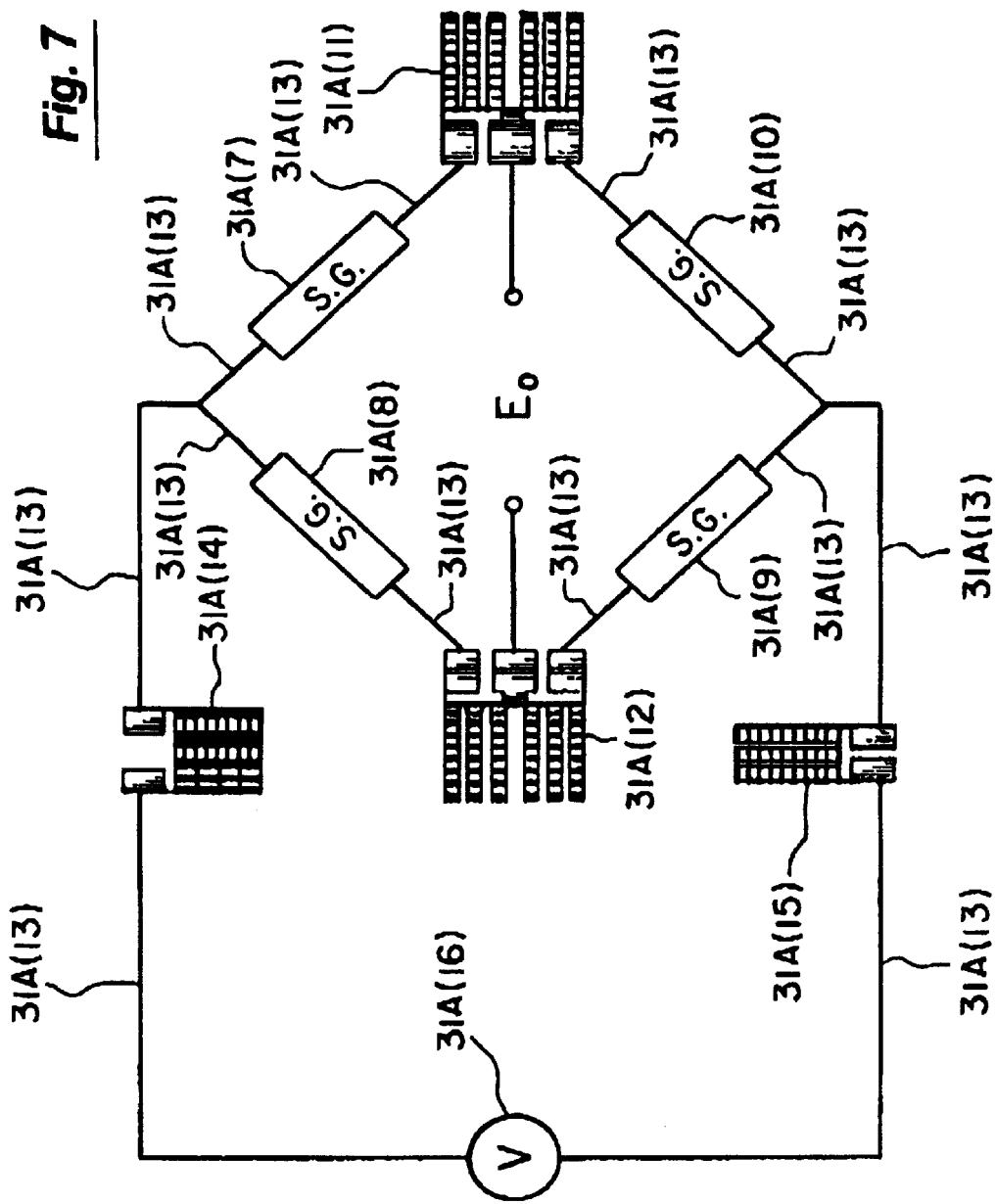
FIG. 7 is an electrical circuit diagram of a representative load cell such as those shown in FIGS. 2, 3, 5 and 6.

FIG. 7 shows a load cell circuit employing an array of strain gauges and resistor elements. For example, the strain gauges 31A(7), 31A(8), 31A(9) and 31A(10) shown in this circuit diagram are shown forming a part of a Wheatstone bridge circuit. Such Wheatstone bridge circuits serve to produce an electromotive force that is generally depicted as $E_o$ in FIG. 2. That is to say that a mechanical strain experienced by a load cell surface and detected by one or more strain gauge elements 31A(7)', 31A(8)', etc. are transduced into a voltage $E_o$ that is detected and sent to the microprocessor unit 34.

The more specific character and design criteria of such load cells are well known to those skilled in this art and are described in the appropriate literature. For example, they are described in a booklet entitled "Strain Gages, Bondable Resistors, Installation Accessories", published by Micro-Measurement Division, Measurement Group, Inc., Raleigh, N.C. 27611. This booklet is incorporated herein by reference. Those skilled in the load cell manufacturing and application arts also will appreciate that these load cell circuits can be programmed to make various refinement computations, e.g., (1) zero balance calculations, (2) zero temperature shift calculations, (3) zero creep compensation calculations, etc. For example, a zero balance computation can be programmed into the microprocessor 34 to "subtract out" the weight of the wheelchair and display only the weight of the person in it.

Figure 8:
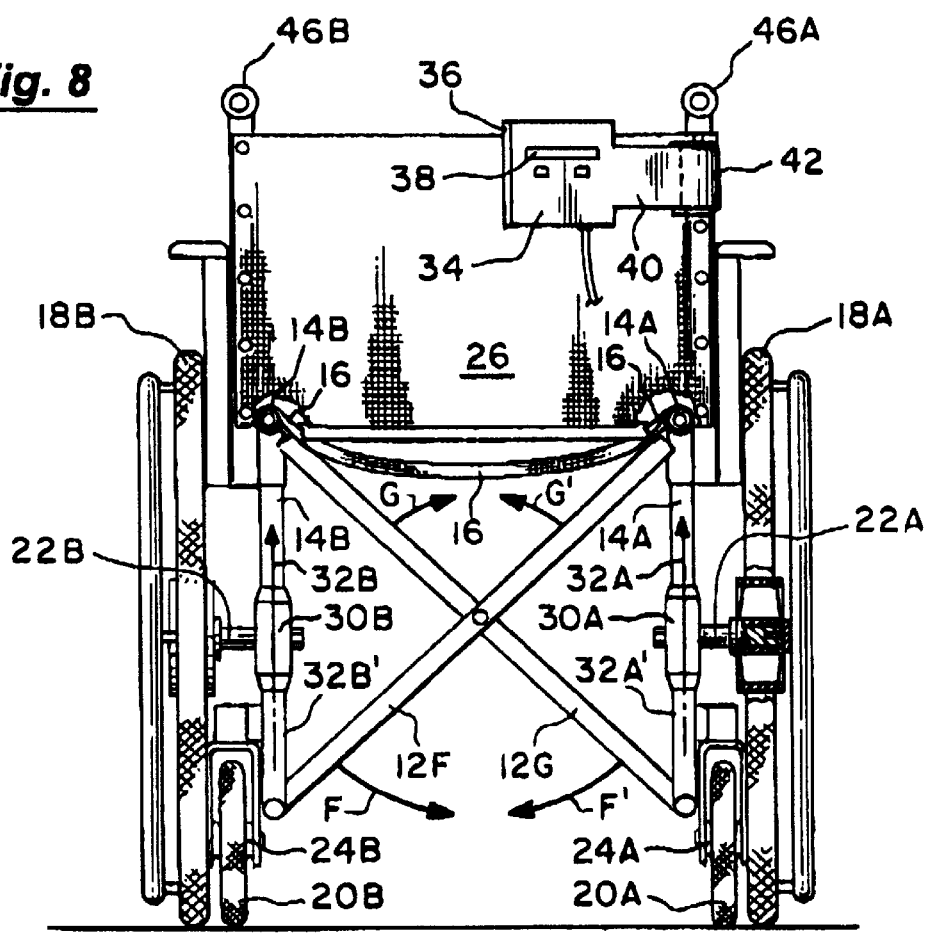
FIG. 8 a rear view of the wheelchair shown in FIG. 1.

FIG. 8 shows a rear view of a wheelchair 10 such as the one shown in FIG. 1. FIG. 8 particularly illustrates that rear wheel 18A can be mounted on its own axle 22A and rear wheel 18B can be mounted on its own axle 22B. FIG. 8 also illustrates that axles 22A and 22B can be respectively mounted in a journal element of such load cells 30A and 30B. Similarly, front wheel 20A is shown mounted to its own axle 24A while front wheel 20B is mounted to its own axle 24B. FIG. 8 also illustrates that the frame 12 of such a wheelchair can be laterally folded through use of pivotally mounted cross support elements 12F and 12G by applying lateral forces F, F', G and G' in the manner generally suggested in FIG. 8.

Figure 9:
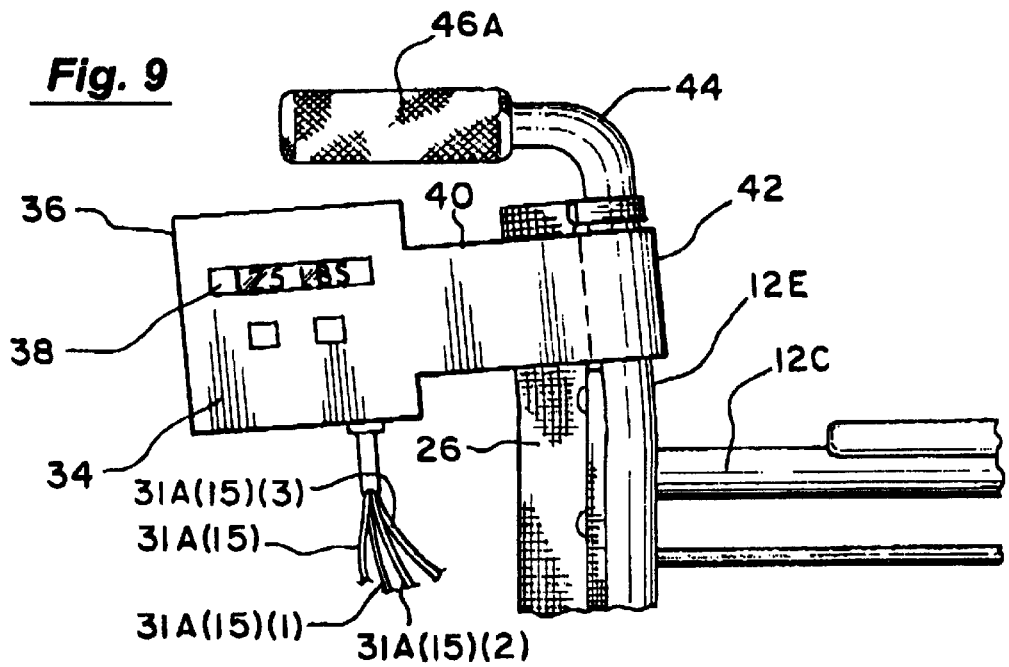
FIG. 9 shows a representative weight-indicating display that is electrically connected (e.g., by electrical wires) to a microprocessor that receives and processes electrical signals from the load cells.

FIG. 9 shows a microprocessor housing 36 having a weight display window 38. The housing 36 contains a microprocessor 34 (which is not actually shown) that is connected via lead wires 31A(15), 31A(15) (1), 31A(15) (2) and 31A(15) (3) to the microprocessor 34. Thus, the microprocessor 34 can receive electrical voltage signals from each of the load cells 30A, 30B, 31A, 31B, etc. via these lead wires. The housing 36 is preferably rotatably mounted on a tubular vertical frame element (e.g., vertical frame element 12E) so that the weight display 38 can be rotated and, hence, seen by the person in the wheelchair as well as by those attending to that person. To this end, the housing 36 can further comprise an arm element 40 whose wheelchair frame contacting end 42 is tubular in nature so that it can be rotatably mounted on a tubular vertical element 12E of the frame 12. Preferably this vertical element 12E will end in a horizontal portion 44 to which a hand grip 46A can be attached for the convenience of the person pushing the wheelchair 10.

Figure 10:
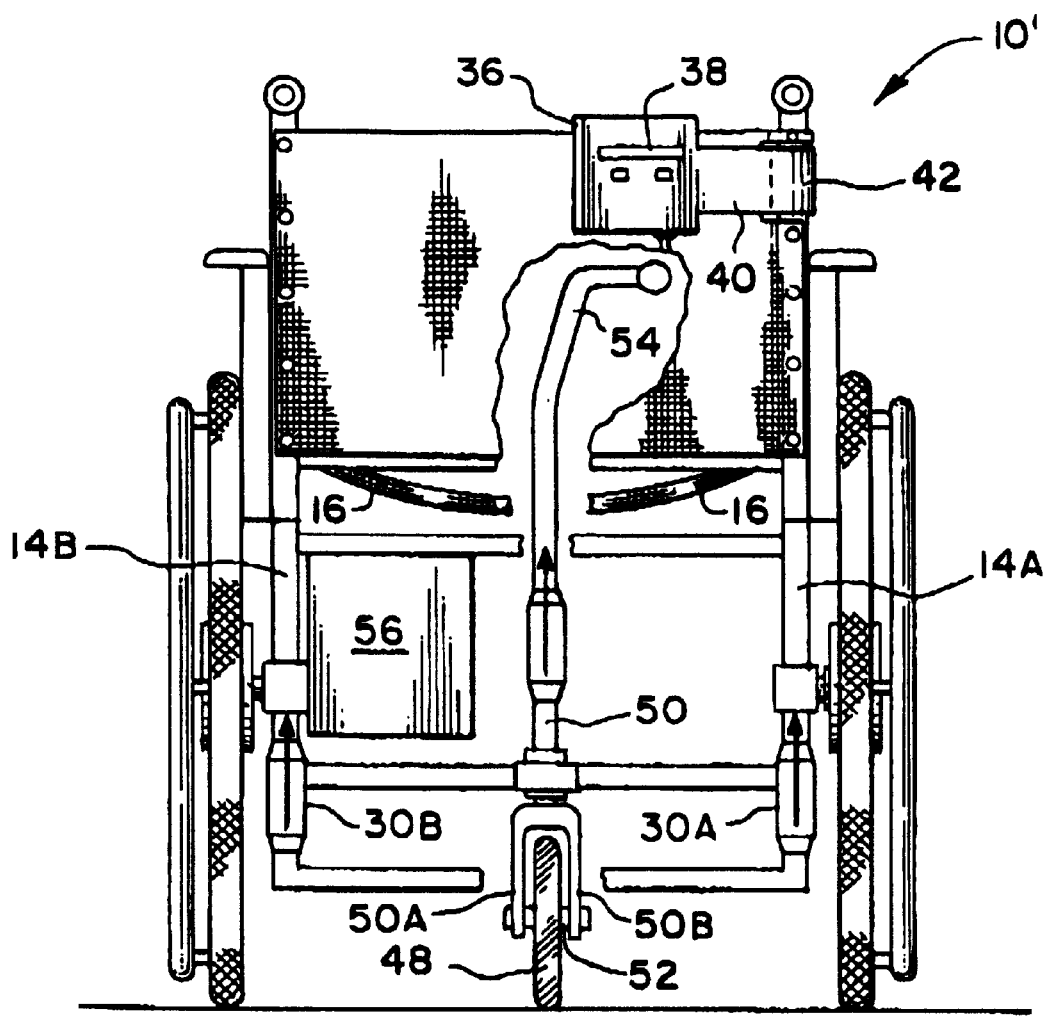
FIG. 10 is a rear view of an alternative embodiment of this invention wherein a wheelchair is provided with three, load-bearing, substantially vertical, support elements (each comprised of a single upper element and a single lower element) and three wheels (rather than the four wheels shown in the mobile weighing apparatus depicted in FIG. 6) and wherein said three wheels are so adapted and arranged that a single front wheel can be used to steer the wheelchair.

FIG. 10 depicts a mobile weighing device 10' mounted on three wheels. In effect the wheelchair 10 shown in FIG. 1 has been modified such that the front of said wheelchair 10' is supported on a single front wheel 48 mounted on a vertical support element 50 having prongs SOA and SOB which serve as a mounting for an axle 52 for the front wheel 48. FIG. 10 also suggests that this front wheel 48 may be guided by a guide bar 54 which is operated by the wheelchair's occupant. Indeed, FIG. 10 further illustrates the case where a mobile weighing apparatus 10' of this patent disclosure may be a motor vehicle such as one powered by an electric motor. That is to say that the mobile weighing apparatus of this patent disclosure may be provided with a power source such as a battery powered electrical motor 56 or a gasoline powered engine.

Those skilled in this art also will appreciate that while this invention generally has been described in terms of the general discussions, specific examples, drawings and preferred embodiments, none of these should be taken individually as a limitation upon the overall inventive concepts which are set forth in the following claims.

Thus having disclosed this invention, what is claimed is:

1. A mobile weighing apparatus comprising:
    (1) a wheelchair frame that includes a plurality of load-bearing, substantially vertical, support elements;
    (2) a plurality of wheels carried on axles attached to the wheelchair frame;
    (3) a plurality of load cells having individual load cells that are respectively connected to members of the plurality of load-bearing, substantially vertical, support elements; and
    (4) a microprocessor that is electrically connected to each load cell in the plurality of load cells and which is capable of processing electrical signals from each load cell in a manner so adapted and arranged that it determines the weight of a person carried by the mobile weighing apparatus.

2. A mobile weighing apparatus comprising:
    (1) a motorized wheelchair frame that includes a plurality of load-bearing, substantially vertical, support elements;
    (2) a plurality of wheels carried on axles attached to the motorized wheelchair frame;
    (3) a plurality of load cells having individual load cells that are respectively connected to members of the plurality of load-bearing, substantially vertical, support elements; and
    (4) a microprocessor that is electrically connected to each load cell in the plurality of load cells and which is capable of processing electrical signals from each load cell in a manner so adapted and arranged that it determines the weight of a person carried by the mobile weighing apparatus.

3. A wheelchair capable of weighing a person carried by the wheelchair, said wheelchair comprising:
    (1) a frame having (i) at least two, opposing, right front, load-bearing, substantially vertical, support elements, (ii) at least two, opposing, left front, load-bearing, substantially vertical, support elements, (iii) at least two, opposing, right rear, load-bearing, substantially vertical, support elements and (iv) at least two, opposing, left rear, load-bearing, substantially vertical, support element;
    (2) a right front wheel rotatably mounted on the frame;
    (3) a left front wheel rotatably mounted on the frame;
    (4) a right rear wheel rotatably mounted on the frame;
    (5) a left rear wheel rotatably mounted on the frame;
    (6) a load cell connected to the at least two, opposing, right front, load-bearing, substantially vertical, support elements;
    (7) a load cell connected to the at least two, opposing, left front, load-bearing, substantially vertical, support elements;
    (8) a load cell connected to the at least two, opposing, right rear, load-bearing, substantially vertical, support elements;
    (9) a load cell connected to the at least two, opposing, left rear, load-bearing, substantially vertical, support element; and
    (10) a microprocessor that is electrically connected to each load cell and which is capable of processing electrical signals from each load cell in a manner such that it determines the weight of a person in the wheelchair and then displays that weight.

4. A wheelchair capable of weighing a person carried by the wheelchair, said wheelchair comprising:
    (1) a frame having (i) two, upper, right front, load-bearing, substantially vertical, support elements, (ii) two, opposing, lower, right front, load-bearing, substantially vertical, support elements, (iii) two, upper, left front, load-bearing, substantially vertical, support elements, (iv) two, opposing, lower, left front, load-bearing, substantially vertical, support elements, (v) two, opposing, right rear, load-bearing, substantially vertical, support elements and (vi) two, opposing, left rear, load-bearing, substantially vertical, support element;
    (2) a right front wheel rotatably mounted to the frame;
    (3) a left front wheel rotatably mounted to the frame;
    (4) a right rear wheel rotatably mounted to the frame;
    (5) a left rear wheel rotatably mounted to the frame;
    (6) a load cell connected to each of the two, upper, right front, load-bearing, substantially vertical, support elements and to each of the two, lower, right front, load-bearing substantially vertical support elements;
    (7) a load cell connected to each of the two, upper, left front, load-bearing, substantially vertical, support elements and to each of the two, opposing, left front, load-bearing, substantially vertical support elements;
    (8) a load cell connected to the two, opposing, right rear, load-bearing, substantially vertical, support element;
    (9) a load cell connected to the two, opposing, left rear, load-bearing, substantially vertical, support elements; and
    (10) a microprocessor that is electrically connected to each load cell and which is capable of processing electrical signals from each load cell in a manner such that it determines the weight of a person in the wheelchair and then displays that weight.

* * * * *